Sept. 24, 1935.  A. FRUM  2,015,178
METHOD FOR THE STABILIZATION OF ELECTROMAGNETIC OSCILLATIONS
Filed Dec. 8, 1933  2 Sheets-Sheet 1
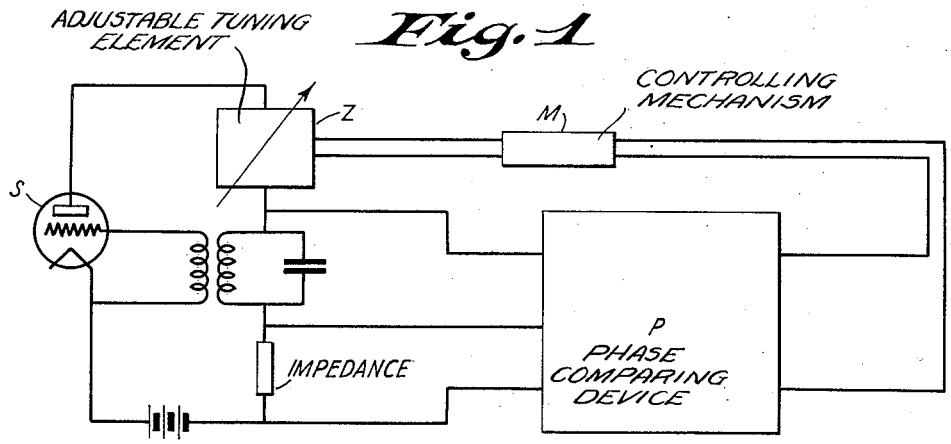
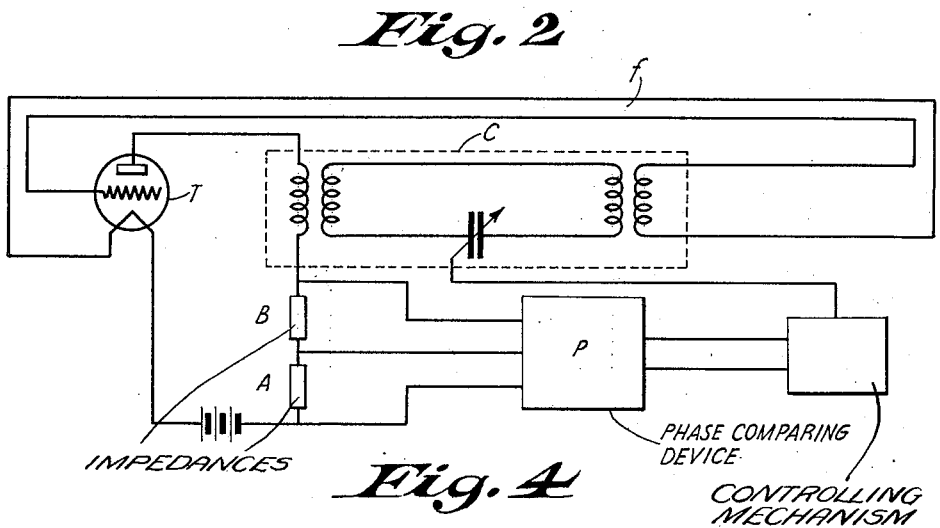
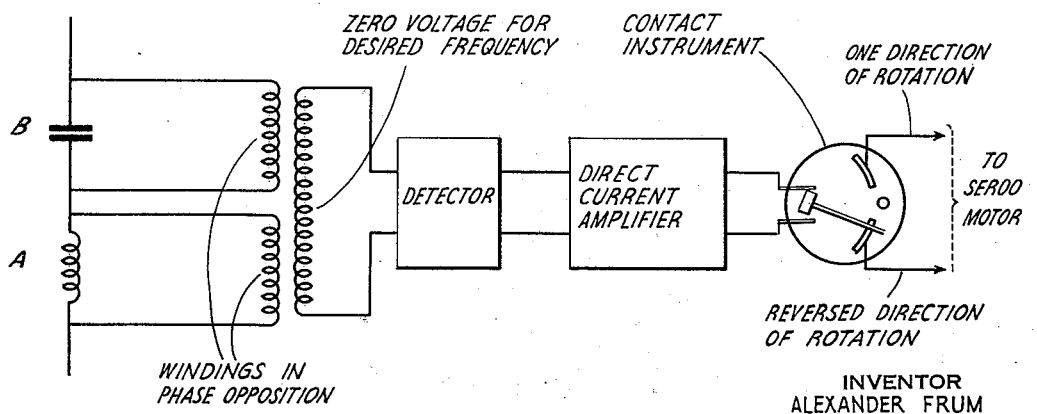
INVENTOR
ALEXANDER FRUM
BY
ATTORNEY

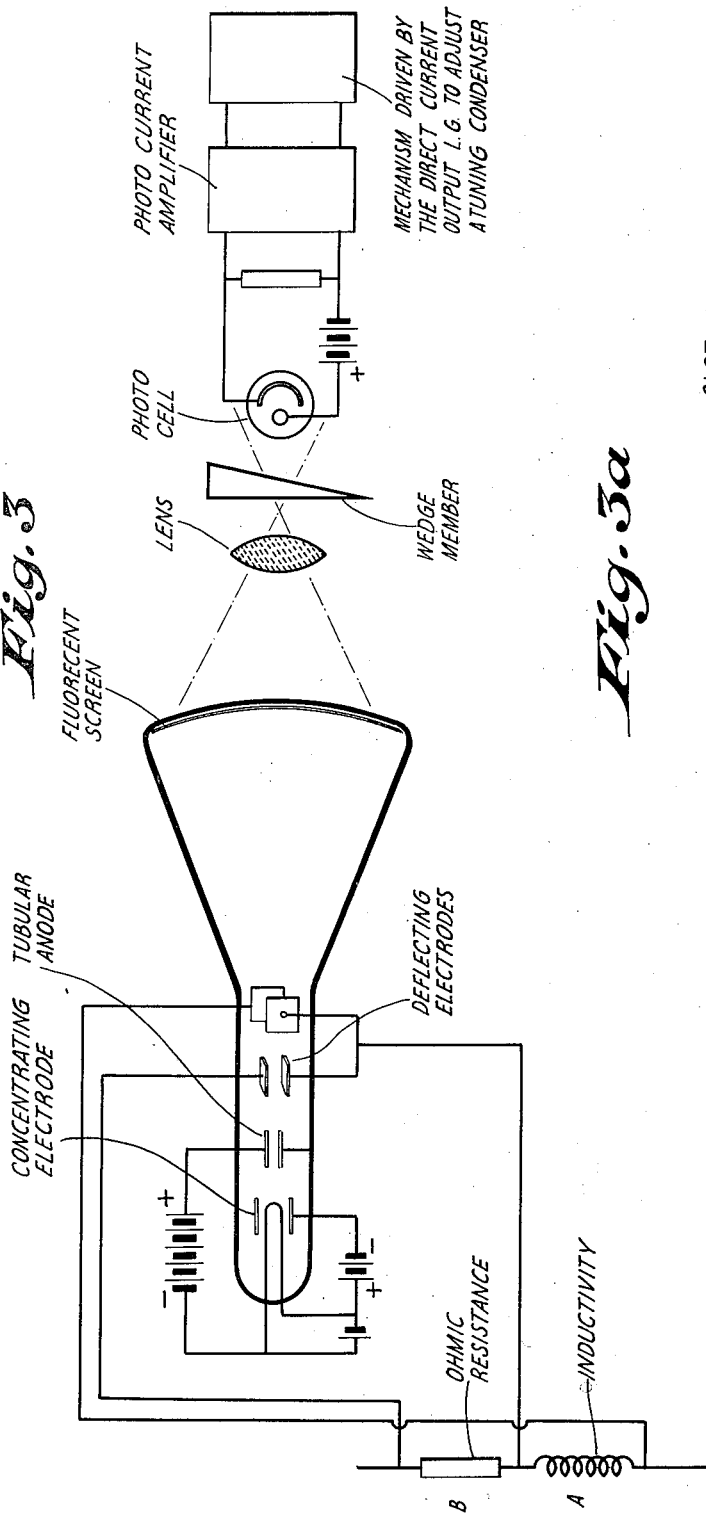
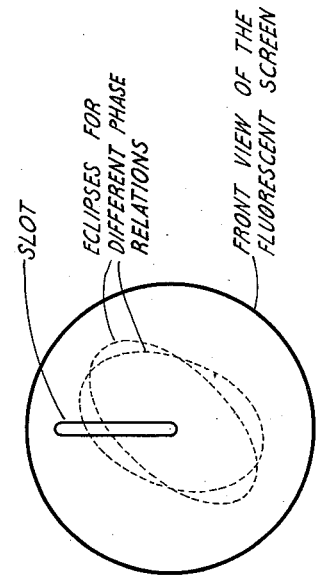

Patented Sept. 24, 1935

2,015,178

UNITED STATES PATENT OFFICE 2,015,178

METHOD FOR THE STABILIZATION OF ELECTROMAGNETIC OSCILLATIONS

Alexander Frum, Berlin, Germany, assignor to Telefunken Gesellschaft für Drahtlose Telegraphie m. b. H., Berlin, Germany, a corporation of Germany Application December 8, 1933, Serial No. 701,475
In Germany November 12, 1932

5 Claims. (Cl. 250—36)

In the high frequency field, oscillation producers are often used which combine a possibly large power supply with a possibly high constancy of the frequency. The simultaneous fulfillment of both requirements can be attained in such manner by means of the methods hitherto known that the constancy of the frequency is maintained by means of a special, weakly loaded control transmitter the oscillations of which are stabilized by means of a frequency standard, while the power supply takes place at separately controlled amplifier stages. In many cases the measure of separating the frequency standard from the power source is still further extended and self excited power transmitters are used which are controlled only indirectly in the frequency across control mechanism of control transmitters or control receivers.

The present invention accomplishes a similar result as the automatic control by means of a frequency standard without however requiring a special control transmitter or control receiver. The method which will be described offers means by which it is possible on the one hand to increase the constancy of the frequency beyond the hitherto attainable value and making it possible on the other hand to obtain a greater power supply at a given constancy of the frequency.

Referring to the drawings, Figs. 1 and 2 show two embodiments of the invention.

Fig. 3 shows in detail, one form of circuit which the elements A, B, and P of Fig. 2 may take. Fig. 3a shows the screen of the cathode ray device and the relative paths of the cathode ray upon the screen for different conditions.

Fig. 4 shows another form of circuit for the elements A, B, and P of Fig. 2.

The method of operation of the invention is based upon the fact that in every transmitter in oscillating condition all voltages and currents have a definite phase relationship to each other. Referring to Fig. 1, with varying frequency, the phase difference of certain electrical values varies in the circuit of the transmitter S. In accordance with the invention these phase changes in self excited systems and dependent upon the frequency are utilized for operating additional phase sensitive arrangements (phase indicator or comparing device P). They furnish an output effect, for instance, a direct current the value of which is proportional to the phase change. By means of this effect which if required may several times be amplified, a correction of the produced frequency deviations can be obtained by means of mechanism such as a motor M through variation of any impedances or tuning elements (Z) of the transmitter (Figure 1). Figure 2 shows another embodiment of the invention.

The present invention utilizes the following condition: If the frequency changes, for instance, due to fluctuation of the plate voltage or load, the relative phase position of certain currents and voltages in the transmitter generally changes in a univocal manner. In accordance with the invention, special devices known as such (phase indicators) and added to the transmitter circuit are influenced by means of these phase changes and which supply an output effect in quantity controlled by the acting phase difference; this output effect serving for the purpose of reactively effecting, in the transmitter circuit, suitable changes which again correct the frequency so as to resume the normal value. In this manner the method can be utilized as conditions require, in order to either increase the constancy of the frequency or to increase the load capacity, or to reduce the requirement as to the quality (sharpness of resonance) of the elements determining the frequency.

The omission of a special frequency standard outside the transmitter to be controlled is the feature which distinguishes the present method from the method of frequency control by means of a separately operating master oscillator or control receiver. The phase sensitive correction organs are actuated by the internal phase conditions of the transmitter proper, which is to be controlled. From this the following practical advantage results: In controlling by means of a special standard transmitter or standard receiver, the frequency in general cannot be continuously varied (unless a variable calibrated standard is available); the present method however makes it possible to maintain the constancy also of a variable transmitter at any adjusted frequency; it is only necessary that the employed phase comparing devices are sufficiently independent of the frequency so that at every control of the self excited frequency they maintain the existing phase conditions.

In the present method ordinary phase indicators can be used as phase sensitive devices with the modification that the phase proportional effect is not used as quantity indication but for the operation of control mechanism. Herein are also included the ordinary devices as used for audiofrequency, such as differential and bridge circuits with rectifiers whose rectifying current is proportional to the phase difference of the applied voltages. In using sufficient amplification the phase sensitivity of these arrangements can be increased to any desired value.

The so-called phase comparing device enables phase amplification in about the following manner with the result that stabilizing action will be increased. Referring to Fig. 2, there are shown three impedances A, B, C, for instance connected in series, placed in the anode circuit of the transmitter tube T. Impedances A and B are arranged to depend upon the frequency in a different manner; the voltages at A and B are applied to the phase comparing device P. The latter, in general, supplies a direct current which changes in accordance with the phase difference. The direct current changes (which may be amplified to any value) are utilized in order to change the impedance C, as indicated, and to thus produce at C phase shifts of any desired value. The obtained phase displacements are rendered useful for instance in conducting the feed-back path F to the grid of tube T across C. Impedance C can be so loosely coupled to the plate circuit (even eventually across a separating tube) that it absorbs a high frequency energy sufficiently high for the feed-back but that in spite thereof it does not react upon the plate circuit in an undesirable manner due to its changes. In order to obtain an inertialess performance of phase amplification, certain known combinations of capacities, inductances and tubes may be chosen for C in such manner that a change in the tube potentials due to the direct current of the phase comparing device, greatly influences the resultant impedance of C and thereby also its phase.

A nearly identical method resides in the utilization of the appearing phase variations directly for the correction of the frequency, for instance by influencing the tuning elements of the transmitter circuit.

So far, only the phase conditions in the circuit have been considered. However, it is also known that at frequency fluctuations not only the phase relations vary but often also the amplitudes, and this is true for the alternating amplitudes as well as for the value of the direct current components. The relations of the amplitudes, for instance the relation between the alternating voltages at an ohmic resistance and a series connected resistance depending upon the frequency (for instance self inductance), changes thereby in a univocal manner with the frequency. (The resistance should obviously, as such, not be influenced by the primary cause of the frequency change such as temperature fluctuations.) It is clear that these variations of the absolute values and their relations can be utilized for stabilizing the transmitter in an entirely corresponding manner as the phase variations. It will be also readily understood that the comparison of the phases and values is not only possible between two electrical values but it can also be carried out simultaneously between several values and furthermore that the correction mechanism may not only influence one element but may also have an effect upon various elements of the transmitter at the same time.

The practical application of the method is facilitated if the phase comparing device forms a uniform additional equipment together with the control mechanism, and which can be easily joined with every transmitter whose constancy of the frequency or load capacity is intended to be increased.

Also, the cathode ray oscillograph, of the type shown in Fig. 3, can be formed into an automatical control organ. A possibility offered in this connection will be briefly described in the following: The two voltages to be compared are each applied to a respective pair of deviating plates of the tube, as shown in the drawings, so that an ellipse is produced upon the screen, the eccentricity of which corresponds with the phase difference (note Fig. 3a). Also, the distance determined by the intersection of the ellipse with a straight line passing through its center indicates a value for the phase difference. Accordingly, a narrow strip passing through the center of the ellipse will be scanned by shutter upon the luminous field behind the luminous screen. The variations in length of the luminous point along this strip are (if continuous control is desired) transformed into intensity variations by means of a wedge member. Otherwise the luminous point is projected in the ordinary manner upon a photo-cell with succeeding amplifier, now operating the correction mechanism.

As shown in the drawings, the two impedances A and B of Fig. 2 of the original document, may consist of an ohmic resistance and of an inductance. In this case the phase difference between the two voltages is 90°. The course of the cathode ray upon the luminescent screen will, in general, be an ellipse, and in the case where both voltages are equal, it will be a circle. When frequency change occurs, the voltage at the resistance will remain equally high at constant amperage, while the voltage at the choke changes. Hence the eccentricity of the ellipse will likewise change, and the portion of the ellipse visible through the slot will be displaced upwards or downwards. If it is desired to make the slot long enough so that it intersects the ellipse twice in order to double the amount of light falling upon the photo-cell, a symmetrical, gray-wedge would have to be used being more clouded from the center towards both sides.

The output effect furnished by the phase comparing device is utilized in order to so vary suitable circuit elements in a known manner, that the deviation of the frequency is thereby corrected. To this end it is necessary that the phase comparing device controls suitable control organs of electrical, optical, thermic or mechanical nature and which may consist of photocells, thermostat controllers, motors etc. The question as to which transmitter elements are influenced admits of a large multiplicity of possibilities; a classification of such, results from the following consideration: In the last analysis a sequence of causes are responsible for frequency variations and the majority of such reside in the variation of the operating voltage, of the load and of the mechanical and thermic condition of the tuning elements. In many cases the primary causes are understood to result in a disturbance of the phase balance due to the produced phase displacements. The restoration of the phase equilibrium requires a greater or smaller change in frequency. In connection therewith there will be noted a primary change, a phase disturbance and frequency deviation. Now the possibility exists of taking corrective measures for one of these three developed stages of the disturbance. The elimination of the said primary causes for a frequency or phase change (for instance change of temperature) offers the advantage that it guarantees the constancy of the frequency as well as the constancy of the other electrical values (direct current values, alternating voltage amplitudes).

As example for this mode of application of the principle a transmitter may be mentioned which itself carries out the temperature control of its quartz thermostat by means of a phase controlled regulating mechanism of the mentioned type. Instead of taking into account the primary causes for the frequency variations, the resultant phase displacements may be considered and the phase changes being produced may be compensated by means of phase shifter or other phase displacing elements inserted at a suitable place. Hereby it is possible to increase the phase sensitivity by means of a kind of phase amplification, namely by the amplification of the phase comparing device whereby also the stabilizing action thereof will be increased.

In Fig. 4 there is schematically indicated a principal embodiment of a phase comparator. This proposal is essentialy based upon a device used for audio-frequency measurements, and which is elaborately described in the Telefunken Zeitung Nr. 62 page 7. The two impedances A and B supplying the comparing voltages in this case are an inductance and a capacity, so that between the voltages a phase displacement of 180° exists. If as in the previous example an inductance is combined with an ohmic resistance, there is present a phase difference of 90°; however, the possibility is readily given to obtain phase opposition by means of phase-rotating intermediate members. The voltages derived from the impedances A and B are supplied to a differential transformer on whose secondary winding the zero voltage prevails at the desired frequency. In case of a frequency change, a residual voltage appears, being detected in a detector. By means of a suitable circuit having two detectors also, the change of direction can be ascertained. The direct currents supplied by the detector are eventually amplified and passed to a contact instrument which, as above stated, may serve for operating the auxiliary motor.

Having thus described my invention what I claim is:

1. A frequency stabilizing system comprising, in combination, an electron discharge device oscillation generator having input and output circuits, a pair of impedances which respond differently to changes in frequency connected in series in said output circuit and so designed as to normally produce voltages which differ in phase relative to one another a predetermined amount, and means coupled to said input circuit responsive to differences in phase of said voltages from said predetermined amount produced in said impedances for restoring said normal phase displacement.

2. A system in accordance with claim 1, characterized in this that said means includes a cathode ray tube having two pairs of deflecting electrodes, connections coupling one of said pairs of electrodes across one of said impedances and the other of said pairs of electrodes across the other impedance, and a circuit responsive to the movement of the electron stream in said cathode ray tube for transforming phase differences into energy having proportional values.

3. A frequency stabilizing system comprising, in combination, an electron discharge device oscillation generator having an input and an output circuit, a substantially non-inductive resistance and an inductance directly connected in series in said output circuit for producing respectively equal voltages which present a phase difference of 90° relative to each other, in response to a flow of current therein of a predetermined frequency, and means coupled to said input circuit responsive to differences in voltages across said resistance and inductance caused by a change in frequency in said generator for restoring said predetermined frequency.

4. A frequency stabilizing system comprising, in combination, an electron discharge device oscillation generator having an input and an output circuit, a substantially non-inductive resistance and an inductance directly connected in series in said output circuit for producing respectively equal voltages which present a phase difference of 90° relative to each other in response to a flow of current therein of a predetermined frequency, and means coupled to said input circuit responsive to differences in voltage across said resistance and inductance caused by a change in frequency in said generator for restoring said predetermined frequency, said means comprising a cathode ray tube having two pairs of deflecting electrodes, connections coupling one of said pairs of electrodes across one of said impedances and the other of said pairs of electrodes across the other impedance, and a circuit responsive to the movement of the electron stream in said cathode ray tube for transforming phase differences into energy having proportional values.

5. A frequency stabilizing system comprising, in combination, an electron discharge device oscillation generator having input and output circuits, a pair of impedances of unlike sign connected in series in said output circuit for producing, in response to a flow of current of a predetermined frequency in said output voltages which are displaced 180°, a differential transformer having a plurality of windings coupled to said impedance and a third winding coupled to a detector for detecting voltage differences due to variations in frequency, a feedback path between said input and output circuits including a frequency determining element and means coupled to and responsive to the detected energy from said detector for influencing said element to compensate for variations from said predetermined frequency.

ALEXANDER FRUM.